US012578094B1

(12) United States Patent
Callaway et al.

(10) Patent No.: US 12,578,094 B1
(45) Date of Patent: Mar. 17, 2026

(54) MATRIX FOR CERAMIC-CONTAINING MATERIALS

(71) Applicant: RTX CORPORATION, Farmington, CT (US)

(72) Inventors: Evan B Callaway, Goleta, CA (US); Olivier H Sudre, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/215,969

(22) Filed: May 22, 2025

(51) Int. Cl.
| | |
|---|---|
| *F23R 3/00* | (2006.01) |
| *F02C 7/00* | (2006.01) |
| *C04B 41/00* | (2006.01) |
| *C04B 41/50* | (2006.01) |
| *C04B 41/52* | (2006.01) |
| *C04B 41/89* | (2006.01) |

(52) U.S. Cl.
CPC ............... *F23R 3/007* (2013.01); *F02C 7/00* (2013.01); *C04B 41/009* (2013.01); *C04B 41/5059* (2013.01); *C04B 41/52* (2013.01); *C04B 41/89* (2013.01); *F05D 2300/611* (2013.01)

(58) Field of Classification Search
CPC .......... F23R 3/007; F02C 7/00; C04B 41/009; C04B 41/5059; C04B 41/52; C04B 41/89; C04B 2235/5208; C04B 2235/5216; C23C 16/22; C23C 16/325; B23P 15/00; F05D 2300/611
USPC ............................................. 428/293.4–294.4
See application file for complete search history.

(56) References Cited

U.S. PATENT DOCUMENTS

| | | | | |
|---|---|---|---|---|
| 5,635,300 | A | 6/1997 | Kostikov et al. | |
| 6,347,446 | B1 | 2/2002 | Luthra et al. | |
| 7,597,838 | B2 * | 10/2009 | Subramanian | C04B 35/565 |
| | | | | 428/297.4 |
| 10,370,301 | B2 * | 8/2019 | Chamberlain | C04B 35/62868 |
| 10,604,454 | B1 * | 3/2020 | Zhu | C04B 41/89 |
| 10,807,912 | B1 * | 10/2020 | Zhu | C04B 35/481 |
| 11,046,615 | B2 | 6/2021 | Luthra et al. | |
| 11,920,497 | B2 * | 3/2024 | Sudre | C04B 35/62884 |
| 12,325,670 | B2 * | 6/2025 | She | C04B 35/565 |
| 2011/0071013 | A1 | 3/2011 | Newton et al. | |
| 2013/0105806 | A1 * | 5/2013 | Liu | H10F 77/122 |
| | | | | 257/E21.318 |
| 2016/0107940 | A1 * | 4/2016 | Lazur | C04B 41/5064 |
| | | | | 427/249.2 |
| 2016/0356164 | A1 * | 12/2016 | Freeman | F01D 5/284 |
| 2022/0178262 | A1 * | 6/2022 | Sudre | C04B 35/62897 |
| 2024/0043345 | A1 * | 2/2024 | Callaway | C04B 35/62894 |
| 2024/0218798 | A1 * | 7/2024 | Sudre | C04B 35/565 |
| 2025/0243124 | A1 * | 7/2025 | Callaway | C04B 35/62884 |
| 2025/0257013 | A1 * | 8/2025 | Callaway | C04B 35/62871 |

* cited by examiner

*Primary Examiner* — William H Rodriguez
(74) *Attorney, Agent, or Firm* — Ross J. Christie; Millen, White, Zelano & Branigan, P.C.

(57) ABSTRACT

A ceramic-containing material, comprising a substrate comprising a ceramic material; an interface coating layer disposed on the ceramic material; and a crystalline matrix disposed on the interface coating layer, the crystalline matrix being substantially free of an amorphous phase and comprising a boron-doped material having a boron dopant present in an amount of less than approximately 10 atomic weight percent.

19 Claims, 4 Drawing Sheets

200

250
240
230
220
210

100

| Loading a substrate into an apparatus | — 110 |

120 — | Heating the substrate |

| Depositing a precursor interface coating (IFC) material | — 130 |

140 — | Optionally depositing a precursor silicon carbide crystalline seed |

| Depositing a precursor matrix material and a precursor dopant material | — 150 |

160 — | Optionally depositing a precursor seal coating material |

200

250

240

230

220

210

300

340

320

310

MATRIX FOR CERAMIC-CONTAINING MATERIALS

FIELD OF THE INVENTION

The subject matter disclosed herein relates to matrices and, in particular, to matrices for ceramic-containing materials.

BACKGROUND OF THE INVENTION

In service environments, matrix cracks provide a pathway for rapid ingress of oxidants and subsequent degradation of interface coatings (IFC) and fibers. These composite materials typically degrade in use at elevated temperature through the existence of or formation of micro-cracks in the ceramic matrix that allow ingress of oxygen and moisture that then react with the exposed interface coating on the fibers. When the BN-based interface coating reacts with oxygen and/or moisture, it forms a $B_2O_3$ glass phase that bonds the matrix to the fiber and reduces composite behavior in the CMC. As this mechanism continues to propagate over many thermal/mechanical cycles, new micro cracks are formed and more areas react until the bulk of the CMC structure no longer exhibits composite toughening and can thus fails catastrophically.

In combustion environments containing $O_2$ and $H_2O$, SiC based ceramics can oxidize. In environments where the resulting $SiO_2$ layer is stable, it protects the base SiC from further degradation. This protection mechanism works well in isothermal situations with relatively low water vapor content due to the extremely low oxygen diffusion rate of oxygen through $SiO_2$. Under cyclic thermal loading, the silica layer is compromised upon crystallization of the amorphous $SiO_2$ layer and subsequent high/low quartz phase change. Upon reheating, additional base SiC is consumed to replenish the silica protection layer.

In environments that contain high concentrations of water vapor, the $SiO_2$ layer can react and form volatile hydroxides or oxy-hydroxides, leading to depletion of the protective oxide surface. In particular, this mechanism induces ablation of the silica protective layer in high velocity gas streams found in propulsion applications. At the highest temperatures, ($>1500°$ C.) ablative loss of the silica layer can also occur by fluid flow due to its reduced viscosity. In SiC based CMC materials, the silica protection mechanism is the primary defense against oxidation and oxygen and moisture ingress on the surface of the composite, on crack surfaces and at the interface coating near the fiber surface. However, the impact of cyclic thermal loading is amplified by the more critical oxidation of the interface coating that occurs before a continuous silica phase is formed across the crack surfaces and seals the micro-cracks. Conversely, at low temperatures ($<800°$ C.) a rapid degradation mechanism, also known as pesting, can occur in CMC materials. Pesting can occur when the matrix experiences microcracking and the underlying interface coating begins degrading, yet the operating temperatures and conditions are not hot enough for a protective silica layer to form.

Consequently, there still exists a need for restricting oxidant ingress.

SUMMARY OF THE INVENTION

The present disclosure is directed, in a first aspect, to a ceramic-containing material, comprising a substrate comprising a ceramic material; an interface coating layer disposed on the ceramic material; and a crystalline matrix disposed on the interface coating layer, the crystalline matrix being substantially free of an amorphous phase and comprising a boron-doped material having a boron dopant present in an amount of less than approximately 10 atomic percent.

In further embodiments of the present disclosure, including further embodiments of the above exemplary embodiments, the boron dopant present comprises approximately 2 atomic percent to approximately 10 atomic percent.

In further embodiments of the present disclosure, including further embodiments of the above exemplary embodiments, the boron dopant present comprises approximately 5 atomic percent to approximately 10 atomic percent.

In further embodiments of the present disclosure, including further embodiments of the above exemplary embodiments, the ceramic-containing material further comprises an interface protective coating layer disposed between the interface coating layer and the crystalline matrix.

In further embodiments of the present disclosure, including further embodiments of the above exemplary embodiments, the interface protective coating layer comprises a thickness of approximately 0.5 μm to approximately 2 μm.

In further embodiments of the present disclosure, including further embodiments of the above exemplary embodiments, the interface protective coating layer comprises silicon carbide.

In further embodiments of the present disclosure, including further embodiments of the above exemplary embodiments, the ceramic-containing material further comprises a seal coating layer disposed on the crystalline matrix and opposite an interface protective coating layer.

In further embodiments of the present disclosure, including further embodiments of the above exemplary embodiments, the seal coating layer comprises a thickness of approximately 1 am to approximately 10 μm.

In further embodiments of the present disclosure, including further embodiments of the above exemplary embodiments, the seal coating layer comprises silicon carbide.

In further embodiments of the present disclosure, including further embodiments of the above exemplary embodiments, the boron dopant is dispersed throughout the crystalline matrix.

In further embodiments of the present disclosure, including further embodiments of the above exemplary embodiments, the boron dopant is graded throughout the crystalline matrix.

In further embodiments of the present disclosure, including further embodiments of the above exemplary embodiments, the boron dopant is present at a greater concentration proximate to the interface coating layer.

In further embodiments of the present disclosure, including further embodiments of the above exemplary embodiments, the boron dopant is present at a greater concentration opposite the interface coating layer.

In further embodiments of the present disclosure, including further embodiments of the above exemplary embodiments, the crystalline matrix comprises a thickness of approximately 50 μm to approximately 200 μm.

In further embodiments of the present disclosure, including further embodiments of the above exemplary embodiments, the crystalline matrix comprises a boron-doped carbide-containing material.

In further embodiments of the present disclosure, including further embodiments of the above exemplary embodiments, the boron-doped carbide-containing material comprises a boron-doped silicon carbide.

In further embodiments of the present disclosure, including further embodiments of the above exemplary embodiments, the substrate comprises a gas turbine engine component.

In further embodiments of the present disclosure, including further embodiments of the above exemplary embodiments, the ceramic material comprises any one or more of the following: a ceramic fiber, a ceramic tow, a ceramic preform, and combinations thereof.

In further embodiments of the present disclosure, including further embodiments of the above exemplary embodiments, the amorphous phase comprises less than 5% by weight of the crystalline matrix.

In another embodiment, the present disclosure is directed to a method of fabricating a ceramic-containing material, comprising the steps of loading a substrate comprising a ceramic material into a reactor; depositing a precursor interface material onto the ceramic material to form an interface coating layer; and depositing a precursor matrix material and a precursor dopant material onto the interface coating layer to form a crystalline matrix, the crystalline matrix being substantially free of an amorphous phase and comprising a dopant present in an amount of less than approximately 10 atomic percent.

In further embodiments of the present disclosure, including further embodiments of the above exemplary embodiments, the boron dopant present comprises approximately 2 atomic percent to approximately 10 atomic percent.

In further embodiments of the present disclosure, including further embodiments of the above exemplary embodiments, the boron dopant present comprises approximately 5 atomic percent to approximately 10 atomic percent.

In further embodiments of the present disclosure, including further embodiments of the above exemplary embodiments, the method further comprises heating the substrate prior to depositing the interface coating layer.

In further embodiments of the present disclosure, including further embodiments of the above exemplary embodiments, the method further comprises depositing a silicon carbide crystalline seed coating layer disposed between the interface coating layer and the crystalline matrix.

In further embodiments of the present disclosure, including further embodiments of the above exemplary embodiments, the silicon carbide crystalline seed coating layer comprises a thickness of approximately 0.5 μm to approximately 2 μm.

In further embodiments of the present disclosure, including further embodiments of the above exemplary embodiments, the silicon carbide crystalline seed coating layer comprises silicon carbide.

In further embodiments of the present disclosure, including further embodiments of the above exemplary embodiments, the method further comprises depositing a seal coating layer disposed on the crystalline matrix and opposite the silicon carbide crystalline seed coating layer.

In further embodiments of the present disclosure, including further embodiments of the above exemplary embodiments, the seal coating layer comprises a thickness of approximately 1 μm to approximately 10 μm.

In further embodiments of the present disclosure, including further embodiments of the above exemplary embodiments, the seal coating layer comprises silicon carbide.

In further embodiments of the present disclosure, including further embodiments of the above exemplary embodiments, the crystalline matrix comprises a thickness of approximately 50 am to approximately 200 μm.

In further embodiments of the present disclosure, including further embodiments of the above exemplary embodiments, the crystalline matrix comprises a boron-doped carbide-containing material.

In further embodiments of the present disclosure, including further embodiments of the above exemplary embodiments, the boron-doped carbide-containing material comprises a boron-doped silicon carbide.

In further embodiments of the present disclosure, including further embodiments of the above exemplary embodiments, the dopant is dispersed throughout the crystalline matrix.

In further embodiments of the present disclosure, including further embodiments of the above exemplary embodiments, the dopant is graded throughout the crystalline matrix.

In further embodiments of the present disclosure, including further embodiments of the above exemplary embodiments, the dopant is present at a greater concentration proximate to the interface coating layer.

In further embodiments of the present disclosure, including further embodiments of the above exemplary embodiments, the dopant is present at a greater concentration opposite the interface coating layer.

In further embodiments of the present disclosure, including further embodiments of the above exemplary embodiments, the substrate comprises a gas turbine engine component.

In further embodiments of the present disclosure, including further embodiments of the above exemplary embodiments, the ceramic material comprises any one or more of the following: a ceramic fiber, a ceramic tow, a ceramic preform, and combinations thereof.

In further embodiments of the present disclosure, including further embodiments of the above exemplary embodiments, depositing comprises chemical vapor infiltration.

In further embodiments of the present disclosure, including further embodiments of the above exemplary embodiments, the amorphous phase comprises less than 5% by weight of the crystalline matrix.

In yet another embodiment, the present disclosure is directed to a gas turbine engine, comprising: a fan section, a compressor section, a combustor section, a turbine section, an outer casing disposed radially outside of the compressor section, combustor section, and the turbine section, and a core gas path that extends through the compressor section, the combustor section, and the turbine section; and at least one gas turbine engine component comprising: a substrate comprising a ceramic material; an interface coating layer disposed on the ceramic material; and a crystalline matrix disposed on the interface coating layer, the crystalline matrix being substantially free of an amorphous phase and comprising a boron-doped material having a boron dopant present in an amount of less than approximately 10 atomic percent.

In further embodiments of the present disclosure, including further embodiments of the above exemplary embodiments, the boron dopant present comprises approximately 2 atomic percent to approximately 10 atomic percent.

In further embodiments of the present disclosure, including further embodiments of the above exemplary embodiments, the boron dopant present comprises approximately 5 atomic percent to approximately 10 atomic percent.

In further embodiments of the present disclosure, including further embodiments of the above exemplary embodiments, the ceramic material comprises a ceramic matrix composite.

In further embodiments of the present disclosure, including further embodiments of the above exemplary embodiments, the gas turbine engine further comprises a silicon carbide crystalline seed coating layer disposed between the interface coating layer and the crystalline matrix.

In further embodiments of the present disclosure, including further embodiments of the above exemplary embodiments, the silicon carbide crystalline seed coating layer comprises a thickness of approximately 0.5 μm to approximately 2 μm.

In further embodiments of the present disclosure, including further embodiments of the above exemplary embodiments, the silicon carbide crystalline seed coating layer comprises silicon carbide.

In further embodiments of the present disclosure, including further embodiments of the above exemplary embodiments, the gas turbine engine further comprises a seal coating layer disposed on the crystalline matrix and opposite the silicon carbide crystalline seed coating layer.

In further embodiments of the present disclosure, including further embodiments of the above exemplary embodiments, the seal coating layer comprises a thickness of approximately 1 μm to approximately 10 μm.

In further embodiments of the present disclosure, including further embodiments of the above exemplary embodiments, the seal coating layer comprises silicon carbide.

In further embodiments of the present disclosure, including further embodiments of the above exemplary embodiments, the boron dopant is dispersed throughout the crystalline matrix.

In further embodiments of the present disclosure, including further embodiments of the above exemplary embodiments, the boron dopant is graded throughout the crystalline matrix.

In further embodiments of the present disclosure, including further embodiments of the above exemplary embodiments, the boron dopant is present at a greater concentration proximate to the interface coating layer.

In further embodiments of the present disclosure, including further embodiments of the above exemplary embodiments, the boron dopant is present at a greater concentration opposite the interface coating layer.

In further embodiments of the present disclosure, including further embodiments of the above exemplary embodiments, the crystalline matrix comprises a thickness of approximately 50 am to approximately 200 μm.

In further embodiments of the present disclosure, including further embodiments of the above exemplary embodiments, the boron-doped material comprises a boron-doped carbide-containing material.

In further embodiments of the present disclosure, including further embodiments of the above exemplary embodiments, the boron-doped carbide-containing material comprises a boron-doped silicon carbide.

In further embodiments of the present disclosure, including further embodiments of the above exemplary embodiments, the amorphous phase comprises less than 5% by weight of the crystalline matrix.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

Figure 1:
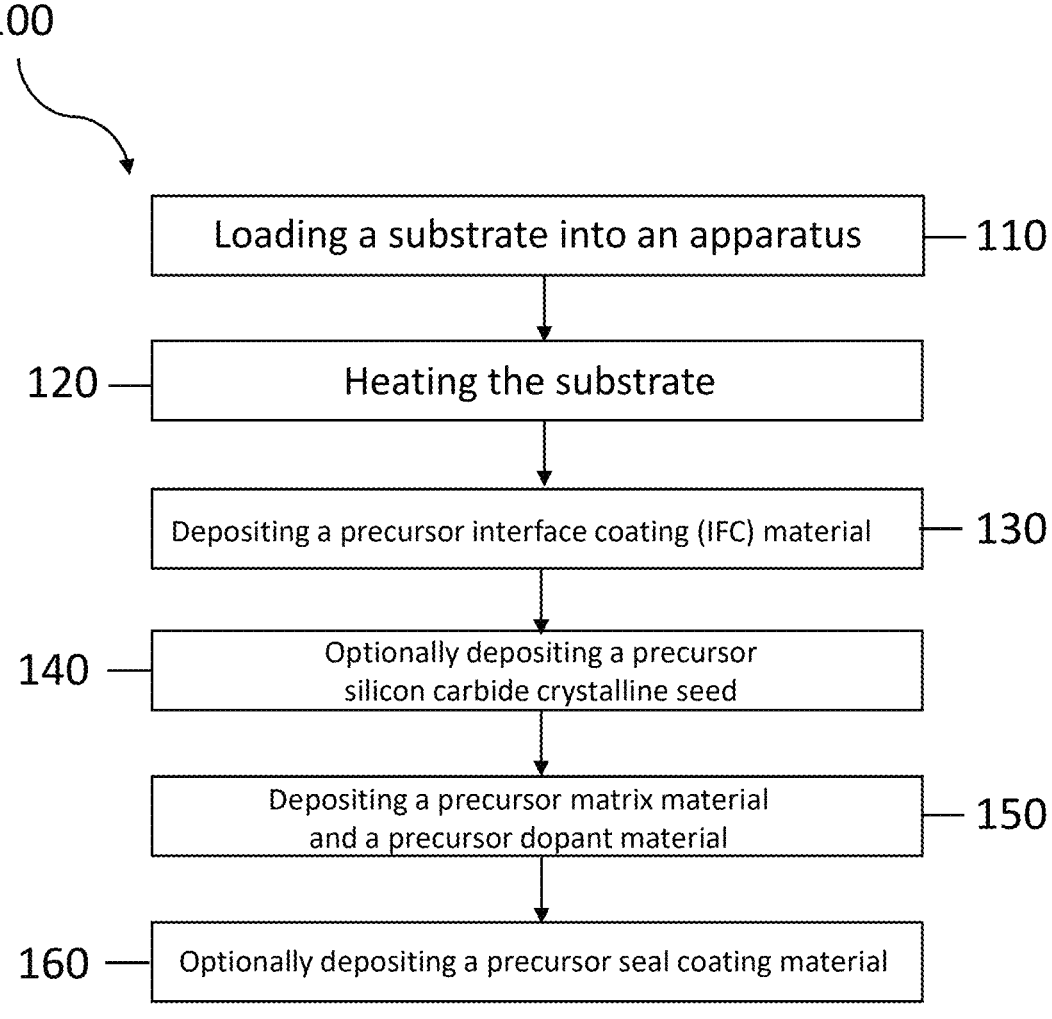
FIG. 1 is a flowchart illustrating an exemplary method of fabricating a ceramic-containing material containing an exemplary crystalline matrix.

The embodiments of the present disclosure can comprise, consist of, and consist essentially of the features and/or steps described herein, as well as any of the additional or optional ingredients, components, steps, or limitations described herein or would otherwise be appreciated by one of skill in the art. It is to be understood that all concentrations disclosed herein are by weight percent (wt. %.) based on a total weight of the composition unless otherwise indicated.

The present disclosure is directed to ceramic-containing materials containing an exemplary crystalline matrix comprising a boron-doped silicon carbide (SiBC). SiBC with minimal boron-doping can maintain a crystalline structure while also enhancing the oxidation rate to quickly seal cracks. More particularly, boron-doping can enhance the rate of oxidation of the matrix crack face and can rapidly seal cracks, thus preventing severe oxidative degradation of IFC and underlying fibers. The exemplary crystalline matrix exhibits a crystalline phase, substantially free of an amorphous phase, that can contain a boron-doped carbide-containing material. More particularly, the bulk of the matrix is crystalline but transition areas located between layers, proximate to grain boundaries, and the like, contain an amorphous phase in an amount of less than approximately 5% by weight of the matrix. In at least one embodiment, the boron dopant may be present in an amount of approximately 2 atomic percent to approximately 10 atomic percent of the carbide-containing material. When the dopant amount present is less than 2 atomic percent the resultant matrix material may not oxidize rapidly enough to prevent or slow down time-dependent oxidative degradation. When the dopant is greater than 10 atomic percent, the resultant matrix material becomes an amorphous phase that may lack in mechanical properties, such as strength and creep. In addition, the volume expansion of the crystalline phase is thought to be larger and more favorable to seal cracks, since the doped crystalline material has a higher density than the amorphous equivalent.

As disclosed herein, the term "ceramic-containing material" may be defined as fiber(s), tow(s), preform(s); individually and combinations thereof; as well as the aforementioned optionally having deposited thereupon or therein a metal, a metalloid; individually, and combinations thereof. Suitable ceramic fibers for use as the fibers and/or fiber tows may include, but are not limited to, silicon carbide, carbon, aluminum oxide, silicon nitride, combinations thereof, and the like. At least one fiber, at least one fiber tow, or at least one fiber and fiber tow may be combined to fabricate the ceramic fiber preform using any suitable technique known.

As used herein, a "coated preform" or "coated substrate" refers to an interface coated ceramic fiber preform or an interface coated ceramic fiber substrate. As also used herein, a "partially densified CMC" or "partially densified ceramic matrix composite" refers to a coated substrate or preform that includes a structural support material layer that facilitates rigidization of the preform to become self-supporting, also known as a rigidized coated substrate or rigidized coated preform. As also used further herein, a "ceramic matrix composite" or "CMC" refers to a matrix infiltrated into the coated substrate or coated preform or alternatively, a matrix infiltrated into the rigidized partially densified CMC.

Referring now to FIG. 1, a flowchart 100 illustrating an exemplary method of fabricating a ceramic-containing material containing an exemplary crystalline matrix is shown. When carrying out the exemplary method, suitable deposition techniques may include, but are not limited to, chemical vapor infiltration, and combinations thereof. At a step 110 of FIG. 1, a substrate may be loaded into an apparatus. The substrate may include, but is not limited to, a ceramic-containing material, e.g., fiber(s), fiber tow(s), or both. Suitable apparatus may include, but are not limited to, any apparatus capable of depositing a material onto a ceramic-containing material. In particular, the apparatus may be a chemical vapor infiltration (CVI) reactor.

Next, at a step 120 of FIG. 1, in preparation for the deposition steps that follow, the substrate may be heated. At a step 130 of FIG. 1, a precursor interface material may be deposited as a coating onto the substrate to form an interface coating (IFC) layer. Any suitable precursor interface material and resultant interface coating may be utilized. The IFC layer may have a thickness sufficient to assist preventing oxidative degradation of the substrate. Next, at an optional step 140 of FIG. 1, a precursor silicon carbide crystalline seed material may be deposited onto the interface coating layer to form a silicon carbide crystalline seed coating layer on the IFC layer. The silicon carbide crystalline seed coating layer may have a thickness sufficient to protect the IFC layer from oxidative degradation.

Next, at a step 150 of FIG. 1, a precursor matrix material and a precursor dopant material may be deposited onto the IFC layer or the optional silicon carbide crystalline seed coating layer to form a doped crystalline matrix. Any suitable precursor matrix material and resultant matrix material may be utilized. Likewise, any suitable precursor dopant material and resultant dopant may be utilized too. The resultant doped crystalline matrix may exhibit and possess a crystalline structure substantially free of an amorphous phase. In addition, the amount of dopant present may be less than approximately 10 atomic percent, and, more particularly, from approximately 2 atomic percent to approximately 10 atomic percent, and, even more particularly, from approximately 5 atomic percent to approximately 10 atomic percent. When the dopant amount exceeds approximately 10 atomic percent, the resultant matrix exhibits and possesses an amorphous phase that introduces detrimental properties. Lastly, at an optional step 160 of FIG. 1, a precursor seal coating layer may be deposited onto the doped crystalline matrix, and opposite the silicon carbide crystalline seed coating layer, to form a seal coating layer. Any suitable precursor seal coating material and resultant seal coating layer may be utilized. The resultant seal coating layer may have a thickness sufficient to protect the doped crystalline matrix from oxidative degradation.

Figure 2:
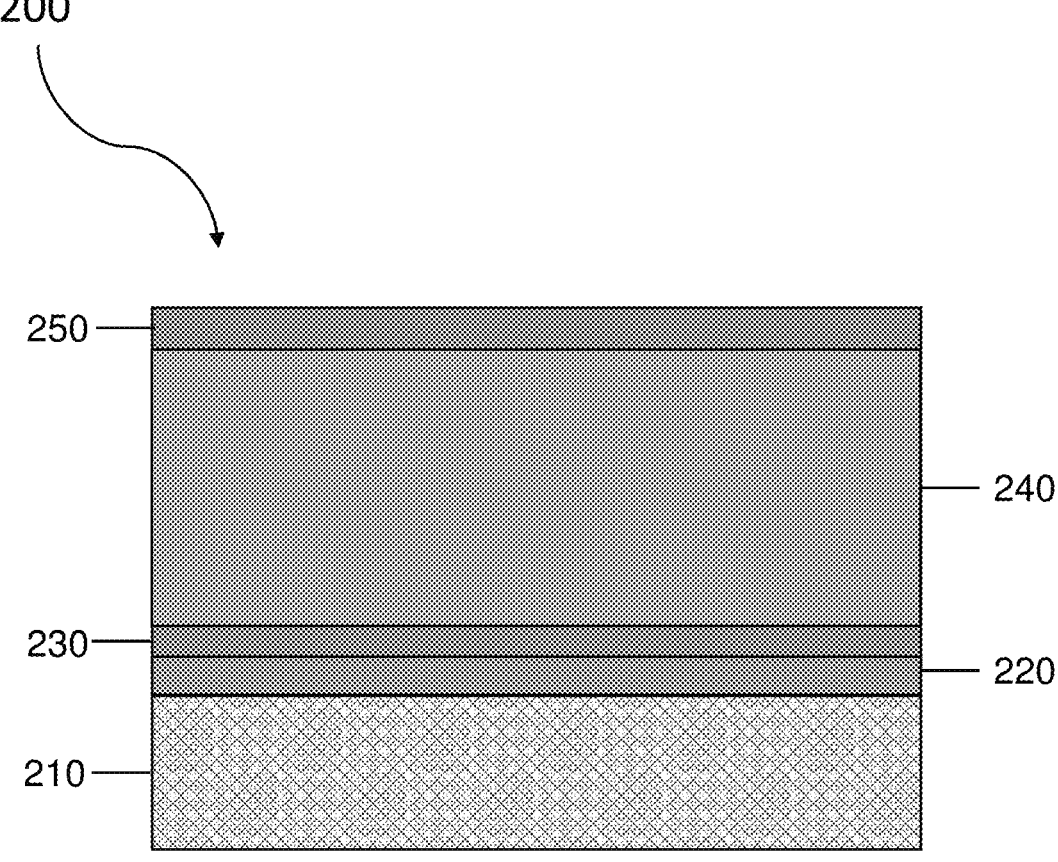
FIG. 2, not drawn to scale, illustrates an exemplary ceramic-containing material containing an exemplary crystalline matrix.
Figure 3:
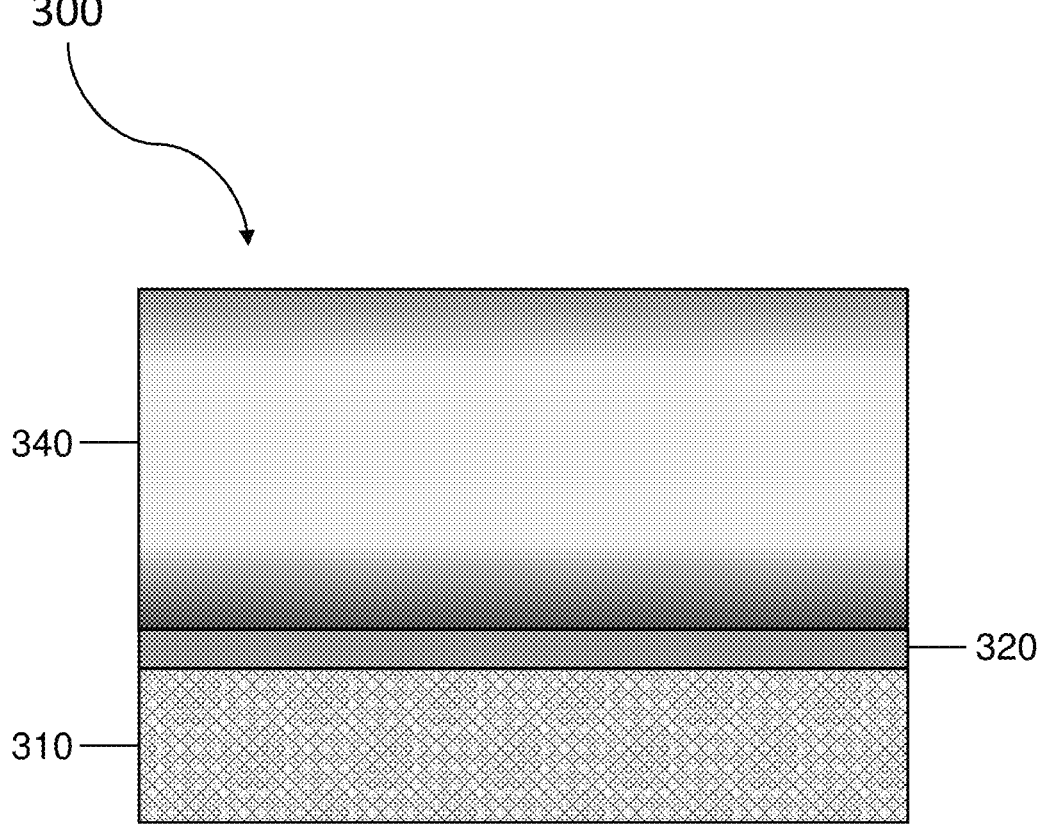
FIG. 3, not drawn to scale, illustrates another exemplary ceramic-containing material containing another exemplary crystalline matrix.

Referring now to FIGS. 2 and 3, two exemplary ceramic-containing materials 200, 300 are illustrated. In each exemplary embodiment, the ceramic-containing materials 200, 300 may have a substrate 210, 310, e.g., a ceramic-containing material such as fiber(s), fiber tow(s), or both. Each substrate 210, 310 may exhibit and possess an IFC layer 220, 320 and doped crystalline matrix 240, 340 disposed thereupon in succession (See FIGS. 2 and 3). In at least one other embodiment, the IFC layer 220, 320 may exhibit and possess a thickness of approximately 0.1 µm to approximately 2 µm, and, more particularly, approximately 0.5 am to approximately 1 µm. Although any suitable matrix material may be utilized, a particular matrix material for use herein may include, but is not limited to, silicon carbide, and combinations thereof. Likewise, although any suitable dopant material may be utilized, a particular dopant material for use herein may include, but is not limited to, boron, and combinations thereof. In at least one embodiment, the resultant doped crystalline matrix may comprise a boron doped silicon carbide and combinations thereof.

As mentioned above, doping approximately 10 atomic percent of boron into the matrix material may fabricate a matrix material exhibiting and possessing a crystalline phase substantially free of an amorphous phase. In general, the amorphous phase can detrimentally affect the matrix material's performance and useful service life. In particular, the amorphous phase can be more susceptible to cracking, thus providing a pathway for the rapid ingress of oxidants and subsequent degradation of both IFC layer 220, 320 and substrate 210, 310. To assist in preventing cracking and oxidative degradation, in at least one embodiment, the doped crystalline matrix 240, 340 may exhibit and possess a thickness of approximately 50 µm to approximately 200 am, and, more particularly, approximately 100 am to approximately 150 µm. To further assist in preventing cracking and oxidative degradation, the dopant may be dispersed uniformly throughout the matrix material (see FIG. 2) or may comprise a through-thickness gradient within the matrix material (see FIG. 3). With respect to a through-thickness gradient, in at least one embodiment, the dopant may be present at a greater concentration proximate to the interface coating layer. In at least one other embodiment, the dopant may be present at a greater concentration opposite the interface coating layer.

Referring specifically now to FIG. 2, the exemplary ceramic-containing materials may further comprise additional layers such as, but not limited to, an optional silicon carbide crystalline seed coating layer 230, an optional seal coating layer 250, and combinations thereof. The silicon carbide crystalline seed coating layer 230, the seal coating layer 250, or both may comprise, but are not limited to, silicon carbide, and combinations thereof. As mentioned above, the silicon carbide crystalline seed coating layer 230 may have a thickness sufficient to protect the IFC layer from oxidative degradation. A suitable thickness for the silicon carbide crystalline seed coating layer 230 may comprise approximately 0.5 µm to approximately 2 µm, and, more particularly, approximately 1 am to approximately 2 µm. As mentioned above, the seal coating layer 250 may have a thickness sufficient to protect the doped crystalline matrix from oxidative degradation. A suitable thickness for the seal coating layer 250 may comprise approximately 1 am to approximately 10 µm, and, more particularly, approximately 5 µm to approximately 10 µm.

Figure 4:
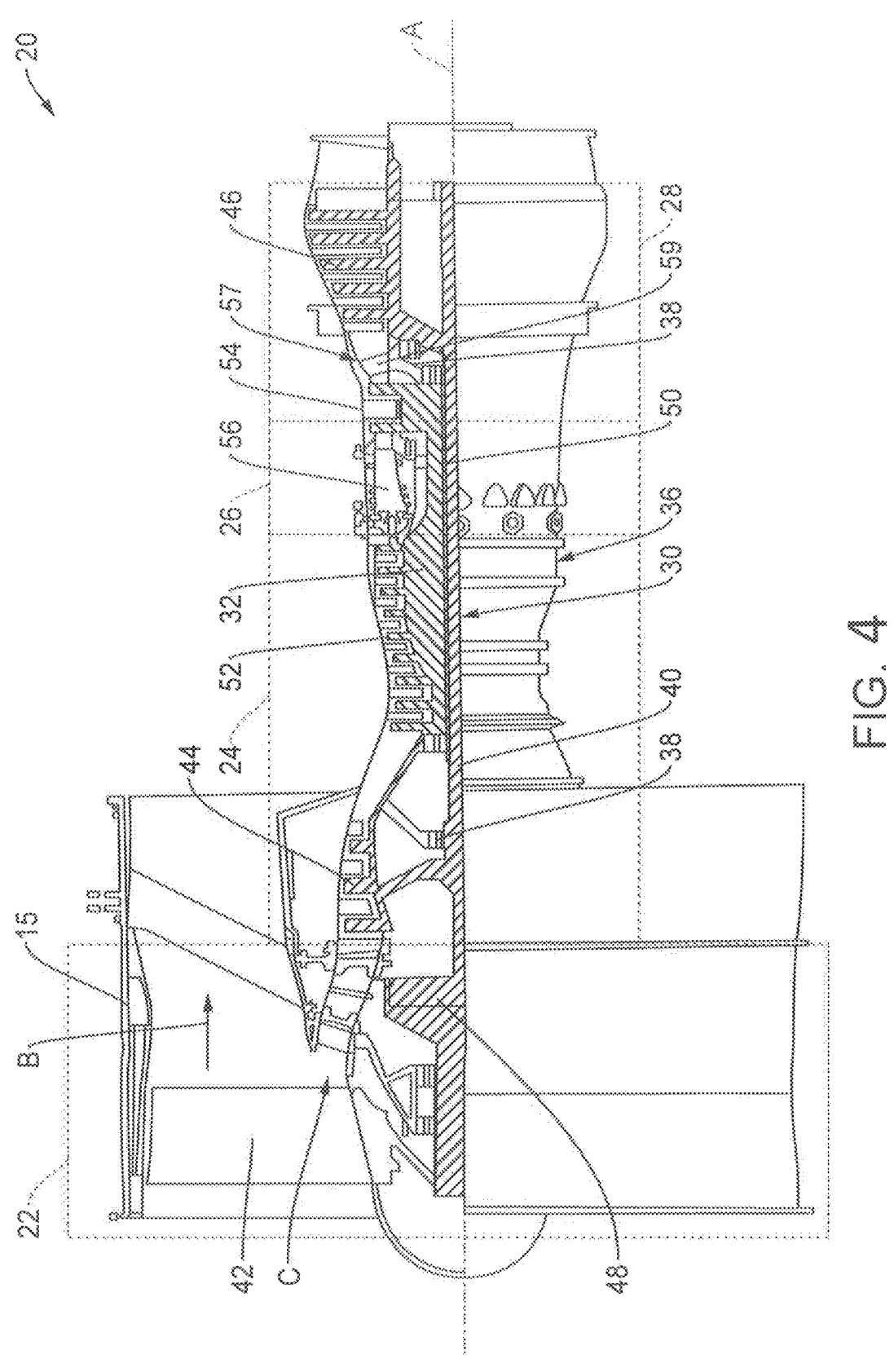
FIG. 4, not drawn to scale, schematically illustrates a gas turbine engine containing gas turbine engine components fabricated using the exemplary ceramic-containing material disclosed herein.

Referring now to FIG. 4, a gas turbine engine 20 is schematically illustrated. The gas turbine engine 20 (i.e., a two-spool turbofan) includes a fan section 22, a compressor section 24, a combustor section 26, and a turbine section 28. Fan section 22 drives air along a bypass flow path B in a bypass duct defined within a housing 15, and also along a core flow path C for compression in compressor section 24, with subsequent introduction into combustor section 26, followed by expansion through turbine section 28. Although FIG. 4 depicts a two-spool turbofan gas turbine engine, it should be understood that the concepts described herein are not limited to use with two-spool turbofans engines and may be applied to other types of turbine engines.

Engine 20 generally includes a low speed spool 30 and a high speed spool 32 mounted for rotation about an engine central longitudinal axis A, relative to an engine static structure 36, via several bearing systems 38. Various bearing systems 38 at various locations may alternatively or additionally be provided. The location of bearing systems 38 may be varied as appropriate to the application.

The low speed spool 30 generally includes an inner shaft 40 that interconnects, a first (or low) pressure compressor 44 and a first (or low) pressure turbine 46. Inner shaft 40 is connected to fan 42 through a speed change mechanism, which in this exemplary embodiment is illustrated as a geared structure 48 to drive fan 42 at a lower speed than the low speed spool 30. High speed spool 32 includes an outer shaft 50 that interconnects a second (or high) pressure compressor 52 and a second (or high) pressure turbine 54. Combustor 56 is positioned between high pressure compressor 52 and high-pressure turbine 54. A mid-turbine frame 57 of the engine static structure 36 may be arranged generally between the high-pressure turbine 54 and the low-pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is first compressed by low pressure compressor 44, and then by the high-pressure compressor 52. Thereafter, the core airflow is mixed and burned with fuel in combustor 56, then expanded in high pressure turbine 54 and low-pressure turbine 46. The mid-turbine frame 57 includes airfoils 59 which are in the core airflow path C. The turbines 46 and 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low-pressure compressor, or aft of the combustor section 26 or even aft of turbine section 28, and fan 42 may be positioned forward or aft of the location of gear system 48.

The turbine section 28 includes at least one rotor and at least one blade extending radially outwardly from the rotor. The turbine section 28 may further include a blade outer air seal(s) (BOAS(s)). The blade outer air seal can be an assembly of a plurality of BOAS segments that together form an annular shaped shroud around the engine's central longitudinal axis A which is positioned between an outer casing of the engine and the turbine blade(s) of the turbine section.

Any one or more of the aforementioned gas turbine engine components of the gas turbine engine 20 may contain the exemplary ceramic-containing material disclosed herein. The aforementioned gas turbine engine components may include, but are not limited to, rotors, blades, blade outer air seal(s); individually, and combinations thereof. In pesting operating environments, the exemplary ceramic-containing material can improve the durability of the gas turbine engine component. In particular, the gas turbine engine component's durability can improve in pesting regimes where silicon carbide matrix crack sealing is sluggish. As discussed above, improved durability can be achieved using boron dopant in the amounts disclosed herein to fabricate a doped crystalline matrix substantially free of amorphous phase(s). The resultant doped crystalline matrix, paired with various interfacial coating concepts, can control the crack sealing location without requiring a multilayer matrix structure. In contrast, elevated boron dopant levels can form an amorphous phase that may lack in mechanical properties, e.g., strength and creep, while lower boron dopant levels may not oxidize rapidly enough to prevent or slow down time-dependent oxidative degradation.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A ceramic-containing material, comprising:
a substrate comprising a ceramic material;
an interface coating layer disposed on the ceramic material; and
a crystalline matrix disposed on the interface coating layer, the crystalline matrix being substantially free of an amorphous phase and comprising a boron-doped material having a boron dopant present in an amount of less than approximately 10 atomic percent.

2. The ceramic-containing material of claim 1, wherein the boron dopant present comprises approximately 2 atomic percent to approximately 10 atomic percent.

3. The ceramic-containing material of claim 2, wherein the boron dopant present comprises approximately 5 atomic percent to approximately 10 atomic percent.

4. The ceramic-containing material of claim 1, further comprising an interface protective coating layer disposed between the interface coating layer and the crystalline matrix.

5. The ceramic-containing material of claim 4, wherein the interface protective coating layer comprises a thickness of approximately 0.5 μm to approximately 2 μm.

6. The ceramic-containing material of claim 4, wherein the interface protective coating layer comprises silicon carbide.

7. The ceramic-containing material of claim 1, further comprising a seal coating layer disposed on the crystalline matrix and opposite an interface protective coating layer.

8. The ceramic-containing material of claim 7, wherein the seal coating layer comprises a thickness of approximately 1 μm to approximately 10 μm.

9. The ceramic-containing material of claim 7, wherein the seal coating layer comprises silicon carbide.

10. The ceramic-containing material of claim 1, wherein the boron dopant is dispersed throughout the crystalline matrix.

11. The ceramic-containing material of claim 1, wherein the boron dopant is graded throughout the crystalline matrix.

12. The ceramic-containing material of claim 11, wherein the boron dopant is present at a greater concentration proximate to the interface coating layer.

13. The ceramic-containing material of claim 11, wherein the boron dopant is present at a greater concentration opposite the interface coating layer.

14. The ceramic-containing material of claim 1, wherein the crystalline matrix comprises a thickness of approximately 50 am to approximately 200 µm.

15. The ceramic-containing material of claim 1, wherein the crystalline matrix comprises a boron-doped carbide-containing material.

16. The ceramic-containing material of claim 15, wherein the boron-doped carbide-containing material comprises a boron-doped silicon carbide.

17. The ceramic-containing material of claim 1, wherein the ceramic material comprises any one or more of the following: a ceramic fiber, a ceramic tow, a ceramic preform, and combinations thereof.

18. The ceramic-containing material of claim 1, wherein the amorphous phase comprises less than 5% by weight of the crystalline matrix.

19. A gas turbine engine, comprising:

a fan section, a compressor section, a combustor section, a turbine section, an outer casing disposed radially outside of the compressor section, combustor section, and the turbine section, and a core gas path that extends through the compressor section, the combustor section, and the turbine section; and at least one gas turbine engine component comprising:

a substrate comprising a ceramic material;

an interface coating layer disposed on the ceramic material; and a crystalline matrix disposed on the interface coating layer, the crystalline matrix being substantially free of an amorphous phase and comprising a boron-doped material having a boron dopant present in an amount of less than approximately 10 atomic percent.

\*   \*   \*   \*   \*